UNITED STATES PATENT OFFICE.

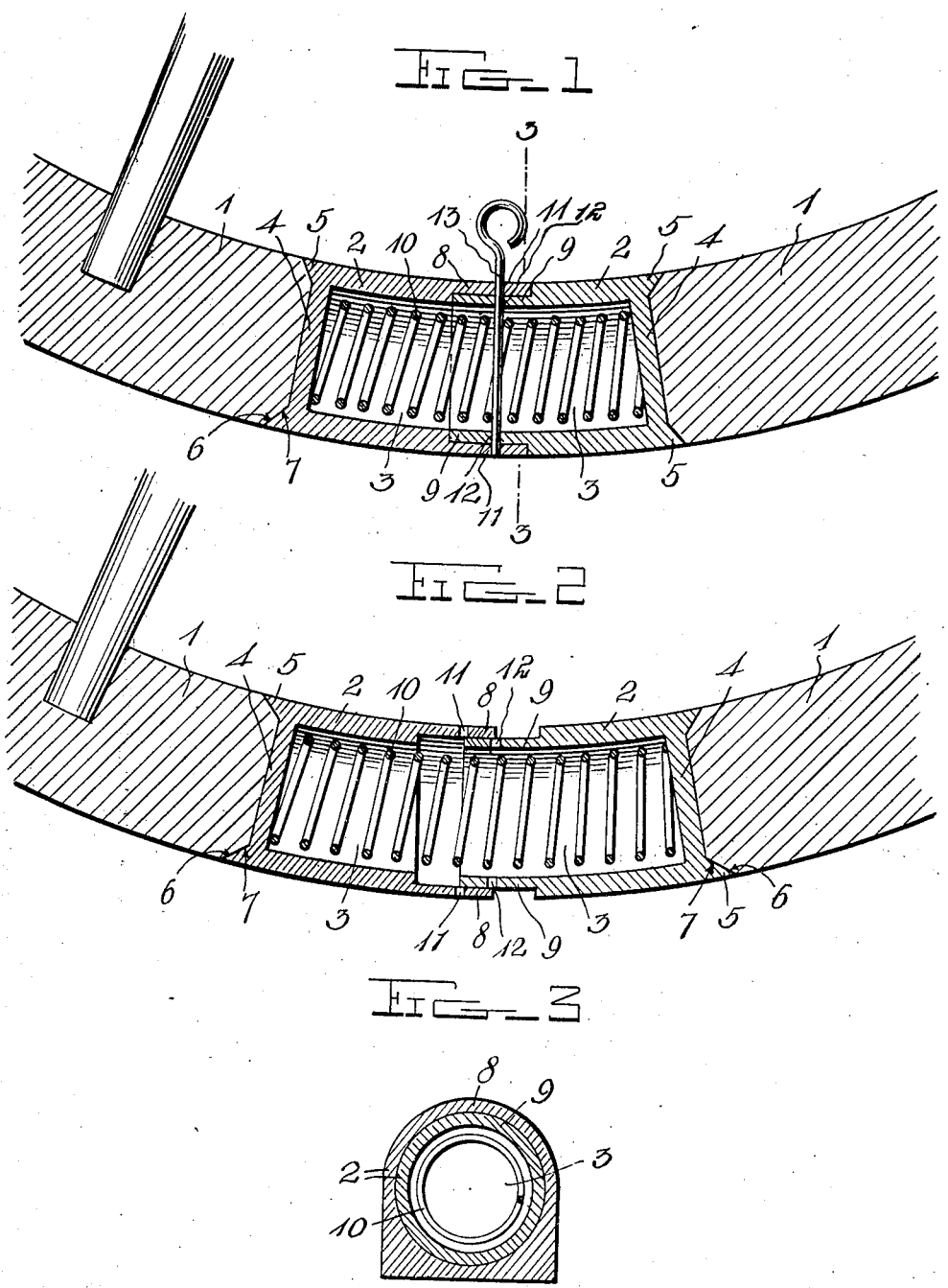

ANSON B. AMENT, OF OAKLAND, CALIFORNIA.

WHEEL.

No. 892,640.   Specification of Letters Patent.   Patented July 7, 1908.

Application filed August 26, 1907. Serial No. 390,191.

*To all whom it may concern:*

Be it known that I, ANSON B. AMENT, a citizen of the United States, residing at Oakland, in the county of Alameda and State of California, have invented certain new and useful Improvements in Wheels; and I do declare the following to be a full, clear, and exact description of the invention, such as will enable others skilled in the art to which it appertains to make and use the same.

This invention relates to improvements in wheels, and has for one of its objects to provide a cheap and simple construction of wheel adapted to automatically expand and contract and so accommodate itself to the contraction and expansion of the felly, and thereby obviate the necessity of subsequently shrinking the tire to maintain a tight rigid wheel.

A further object is to provide a wheel which, while carrying out the above mentioned objects to a greater degree of success than through the use of other devices of this character now in vogue, will be simple and inexpensive in its construction, and eliminate all tire bolts.

In the accompanying drawings,—Figure 1 is a longitudinal section of a portion of a wheel constructed in accordance with the invention, the spring for coöperating with other elements to automatically expand the felly longitudinally in its most contracted position; Fig. 2 is a similar view, the spring expanded; Fig. 3 is a transverse sectional view on the line 3—3 of Fig. 1.

In the embodiment illustrated the numeral 1 designates two adjacent felly sections comprised in the rim of a wheel, the same having their ends arranged a short distance apart. Two elongated members, 2, having longitudinally disposed openings 3 extending from their inner ends to within a suitable distance of their outer or opposite ends, at which ends they are provided with end walls, 4, adapted to abut against or engage the ends of the felly sections, are interposed between the ends of said sections. The outer ends of said elongated members 2 are also provided with outwardly extending portions or flanges, 5, having outwardly inclined surfaces 6 to engage inwardly inclined surfaces 7 at the ends of the felly sections, whereby a secure engagement therebetween may be secured. The inner ends of said members are provided with overlapping flanges 8 and 9, respectively.

To cause the felly to automatically expand or contract, according to the expansion or contraction of the same, I arrange a coiled spring 10 of sufficient strength in the openings in said elongated members 2, which presses the closed ends of the members in engagement with the ends of the felly sections and expands the felly an amount corresponding with the longitudinal contraction of the felly.

To hold the spring in its most contracted condition or position, while the tire is being positioned on the felly, I provide the flange of one of said elongated members 2 with two alined transversely disposed openings or apertures 11, and the flange of the other member with corresponding alined apertures 12 adapted for registration with the apertures 11 and insert a locking pin 13 through the apertures 11 and 12, which when in position, holds said members against longitudinal movement and consequently prevents expansion of the felly in securing the tire in position. After the tire has been set, the locking pin is withdrawn or removed to permit the device to elongate commensurate to the longitudinal contraction of the felly.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined in the appended claims.

Having described my invention, what I claim as new and desire to secure by Letters-Patent is:—

1. In a wheel, the combination with felly sections of two hollow elongated members having outer end walls and overlapping flanges at their inner ends interposed between the felly sections, and a spring arranged in said members for normally maintaining their outer ends in engagement with the ends of the felly sections by self-expansion.

2. In a wheel the combination with felly sections of two hollow elongated members interposed therebetween, said members having outer closed ends adapted to hold or engage the ends of said sections and overlapping flanges at their inner ends, and a spring arranged in said members to expand the members automatically with means for holding said members in their most contracted position.

3. In a wheel, the combination with two adjacent felly sections of hollow elongated members interposed between the sections, said members having outer end walls and outwardly extending flanges extending from the end walls adapted to engage or embrace the ends of the felly sections and having overlapping flanges at their inner ends, and a spring arranged in said members to spread or expand the same by self-expansion, with means for holding said members in the maximum contracted position.

In testimony whereof I have hereunto set my hand in presence of two subscribing witnesses.

ANSON B. AMENT.

Witnesses:
WALTER EDWARD LOGAN,
W. E. BARNARD.